United States Patent
Subramanian et al.

(10) Patent No.: US 9,268,494 B2
(45) Date of Patent: Feb. 23, 2016

(54) LOW POWER CONSUMPTION STORAGE ARRAY

(75) Inventors: Satish Subramanian, Chennai (IN); Senthil Kannan, Pondicherry (IN); Hariharan Kamalavannan, Chennai (IN); Ganesh Sivaperuman, Chennai (IN)

(73) Assignee: NetApp, Inc, Sunnyvale, CA (US)

( * ) Notice: Subject to any disclaimer, the term of this patent is extended or adjusted under 35 U.S.C. 154(b) by 2337 days.

(21) Appl. No.: 12/182,325

(22) Filed: Jul. 30, 2008

(65) Prior Publication Data

US 2010/0027147 A1    Feb. 4, 2010

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC ............ *G06F 3/0634* (2013.01); *G06F 3/0625* (2013.01); *G06F 3/0689* (2013.01); *Y02B 60/1246* (2013.01)

(58) Field of Classification Search
CPC ... G06F 3/0634; G06F 3/0625; G06F 3/0689; Y02B 60/1246
USPC .................................................... 711/114, 162
See application file for complete search history.

(56) References Cited

U.S. PATENT DOCUMENTS

| | | | | |
|---|---|---|---|---|
| 5,155,845 | A * | 10/1992 | Beal et al. ................... | 714/6.12 |
| 5,680,579 | A * | 10/1997 | Young et al. .................. | 711/157 |
| 6,101,459 | A * | 8/2000 | Tavallaei et al. .............. | 702/132 |
| 2004/0205298 | A1* | 10/2004 | Bearden et al. ............... | 711/137 |
| 2009/0083483 | A1* | 3/2009 | Balakrishnan et al. ....... | 711/114 |

* cited by examiner

*Primary Examiner* — Mark Giardino, Jr.
(74) *Attorney, Agent, or Firm* — Haynes and Boone LLP

(57) ABSTRACT

Disclosed is a low power consumption storage array. Read and write cycles are separated so that a multiple disk array can be spun down during periods when there are no write requests. Cooling fans are operated with a pulse-width modulated signal in response to cooling demand to further reduce energy consumption.

8 Claims, 2 Drawing Sheets

LOW POWER CONSUMPTION STORAGE ARRAY

BACKGROUND OF THE INVENTION

Energy prices have risen dramatically over the past few years resulting in increased cost to operate electronic appliances including RAID storage systems. Not only is the energy that is consumed by these devices expensive, the heat generated by these devices requires cooling which additionally raises the cost of operation. More efficient operation of systems, such as RAID systems, will therefore greatly reduce the cost of operation.

SUMMARY OF THE INVENTION

An embodiment of the present invention may therefore comprise a method of reducing power consumption in a storage array comprising: writing data to a multiple disk array in response to a write command; synchronously copying the data from the multiple disk array to a read spare drive; reading data from the read spare drive, and not from the multiple disk array; spinning down aid multiple disk array so that the multiple disk array enters a passive state and consumes less energy whenever a write cycle has not been initiated for a predetermined period; writing additional data to solid state storage whenever an additional write cycle is initiated and the multiple disk array is in the passive state; synchronously copying the additional data written to the solid state storage to the read spare drive; spinning up the multiple disk array in response to initiation of the additional write cycle when the multiple disk array is in the passive state; writing the additional data written to the solid state storage to the multiple disk array after the multiple disk array is spun up; flushing the additional data written to the solid state storage after the data written to the solid state storage is written to the multiple disk array.

An embodiment of the present invention may further comprise a low power consumption storage array comprising: a read spare drive; a multiple disk array; solid state storage; a controller that stores a first set of data in the multiple disk array during a write cycle, copies the first set of data from the multiple disk array to the read spare drive, reads the first set of data from the read spare drive and not from the multiple disk array, spins down the multiple disk array so that the multiple disk array enters a passive state and consumes less energy whenever a write cycle has not been initiated for predetermined period, writes additional data to the solid state storage whenever an additional write cycle is initiated and the multiple disk array is in the passive state, synchronously copies the additional data written to the solid state storage to the read spare drive, spins up the multiple disk array in response to initiation of the additional write cycle when the multiple disk array is in the passive state, writes the additional data written to the solid state storage to the multiple disk array after the multiple disk array is spun up, flushes the additional data written to the solid state storage after the additional data written to the solid state storage is written to the multiple disk array.

DETAILED DESCRIPTION OF THE EMBODIMENTS

Figure 1:
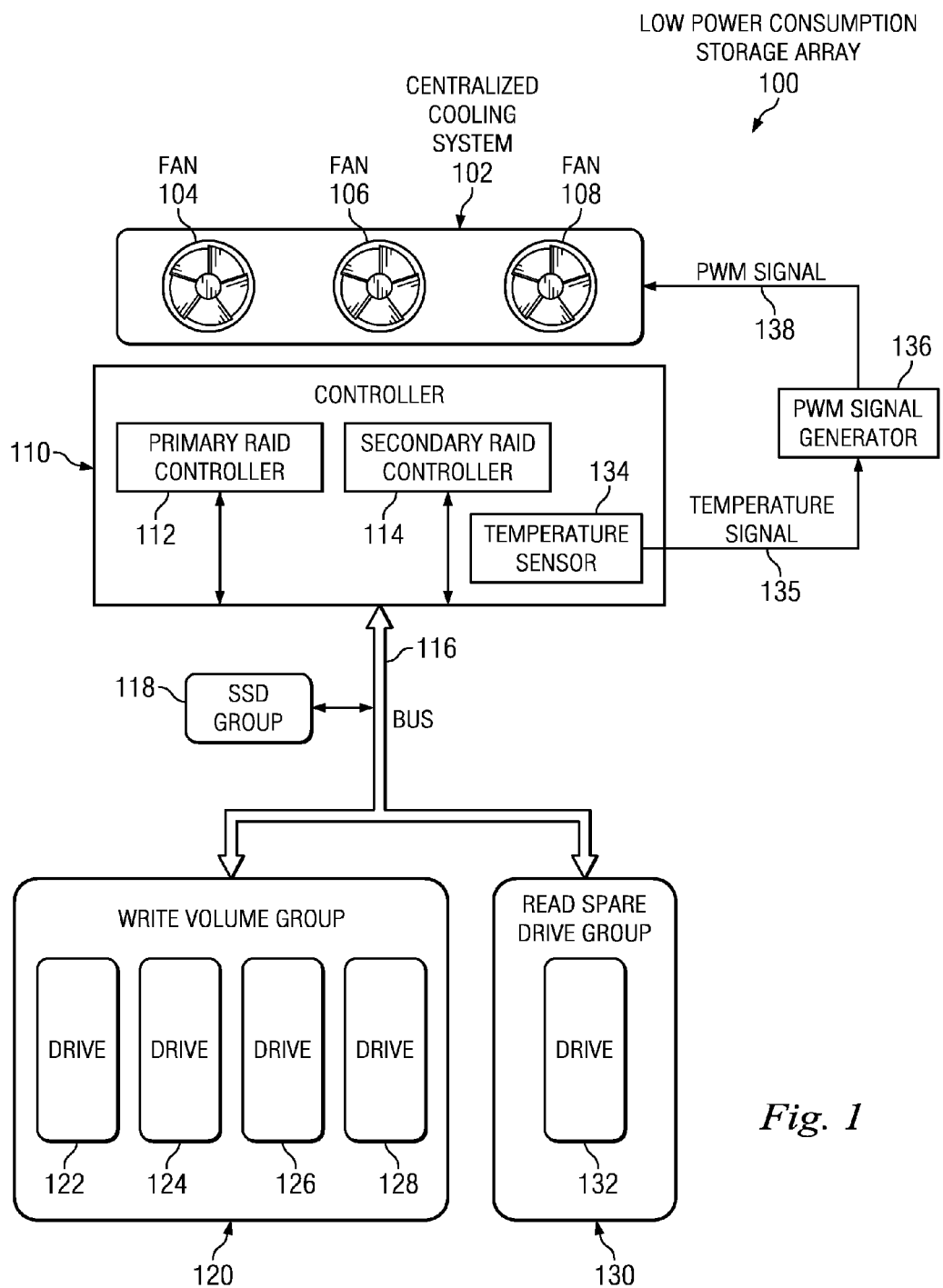
FIG. 1 is a schematic illustration of an embodiment of a low power consumption storage array.

FIG. 1 is a schematic illustration of a low power consumption storage array 100. The low power consumption storage array 100 includes a centralized cooling system 102 that includes fans 104, 106, 108. The centralized cooling system 102 provides cooling to components of the low power storage array 100, as illustrated in FIG. 1. The centralized cooling system 102 operates in response to cooling demand. Most of the heat that is generated by the low power consumption storage array 100 is generated by the mechanical devices, such as the mechanical storage drives and the cooling fans 104, 106, 108. Existing systems use individual cooling units that separately cool the primary RAID controller 112 and the secondary RAID controller 114. By using a centralized cooling system, such as cooling system 102, the number of fans can be reduced. Further, fans 104, 106, 108 operate in response to a pulse-width modulation signal 138. The speed of operation of the fan is controlled by the pulse-width modulation signal 138. The pulse-width modulation signal 138 is generated by a pulse-width modulation signal generator 136 in response to a temperature signal 135 generated by temperature sensors 134 that is indicative of the cooling demand of the system. The pulse-width modulation signal 138 increases in pulse-width as the temperature rises and the low power consumption storage array 100 demands more cooling. In this fashion, fans 104, 106, 108 operate in response to cooling demand and progressively increase in speed in response to the cooling demand. In addition to speed variations as per temperature variations 'n' number of fans out of 'x' of fans can be made to sleep mode. They can be brought to active mode again if the temperature has come to a threshold limit based on the temperature sensors. This results in less power consumption in operating fans. Existing cooling systems operate cooling fans constantly which results in high power consumption and the generation of additional unnecessary heat produced by the cooling fans.

Controller 110, illustrated in FIG. 1, includes a primary RAID controller 112 and a secondary RAID controller 114. The controller 110 is coupled to a bus 116 that transfers data between the controller 110, the solid state disk (SSD) group 118, the write volume group 120 and the read spare drive group 130. The write volume group 120 may comprise a number of separate hard drive devices, such as drive 122, 124, 126, 128 that are operated as a RAID system. The drives 122, 124, 126, 128 can be configured in any desired RAID configuration. Typically, the write volume group 120 will be configured in a RAID 5 configuration. The read spare drive group 130 may comprise a single drive, such as drive 132, that is capable of storing the same amount of data that is stored in the write volume group. For example, each of the drives 122, 124, 126, 128 may comprise 73 gigabyte hard disk drives, while drive 132 may comprise a 219 gigabyte hard disk drive.

It has been observed that hard drive read cycles in RAID arrays drain more current, and hence more power, than write cycles. In other words, when data is read from a hard disk drive, more power is required than the process of writing data to a hard disk drive by providing a read spare drive group 130 that may comprise a single drive 132. A substantial amount of power can be saved by reading data from the single drive 132 than by reading data from the multiple hard disk drive write volume group 120.

In brief, the operation of the embodiment of the low power consumption storage array 100 is described as follows. Data is written by the controller 110 to the write volume group 120, and is either simultaneously written to the read spare drive group 130 or, is synchronously copied from the write volume group 120 to the read spare drive group 130. The data stored on the read spare drive group 130 has the same format as the data stored on the write volume group 120, i.e. striped data. Data read by the controller 110 is read directly by the read spare drive group 130 instead of the write volume group 120. The controller 110 checks the frequency of the write commands for writing data to the write volume group. If the write command has not been received for a predetermined amount of time, the hard drives 122, 124, 126, 128 in the write volume group 120 are spun down to a passive state to consume less power. If a write command is generated by the controller 110 while the hard drives in the write volume group 120 are spun down, data is written directly to the solid state device group 118. The solid state device group 118 also stores pre-fetch data and read-ahead data from the read spare drive group 130. The initiation of a write command while the drives 122, 128 and the write volume group 120 are spun down triggers a command to spin up the hard drives 122-128. Data is stored in a solid state device group 118 during a write command. It is then written to the write volume group 120 and synchronously copied or simultaneously written to the read spare drive group 130. The write data that was stored in the solid state device group 118 is then flushed.

By separating the read and write cycles, the write cycle group, which uses multiple hard disk RAID drives, can be spun down to significantly reduce power consumption. As indicated above, most of the power utilized in storage arrays is used to drive the mechanical components, i.e. the hard disk drives and the fans. Since the read cycles are performed by the read spare drive group 130, the write volume group 120 only has to respond to write commands. By including the solid state device group 118, the hard disk drives 122-128 can be spun down when there is no write command without slowing the system down and consuming less power. In larger systems that use many drives, such as storage area networks (SAN), there can be large power savings without compromising speed or redundancy levels.

Figure 2:
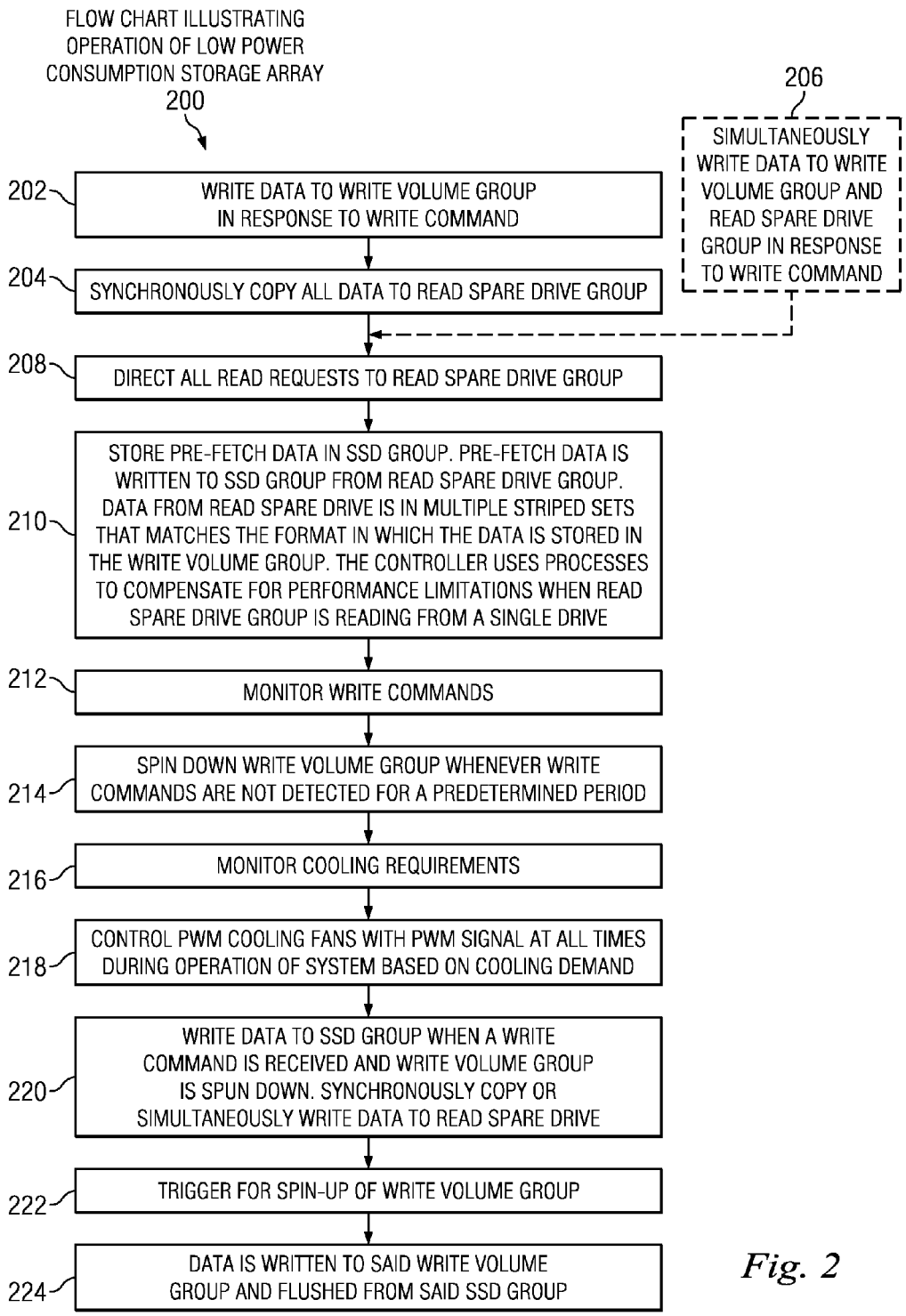
FIG. 2 is a flow diagram illustrating the operation of the embodiment of FIG. 1.

FIG. 2 is a flow chart 200 illustrating the operation of the embodiments of the low power consumption storage array illustrated in FIG. 1. At step 202, the controller 110 writes data to the write volume group 120 in response to a write command received from a computer (not shown) attached to the controller 110. At step 204, the data written to the write volume group 120 is synchronously copied to the read spare drive group 130. Alternatively, at step 206, the controller 110 simultaneously writes data to both the write volume group 120 and the read spare drive group 130. In this case, the data is written to both the write volume group and the spare drive group using the same data structure, i.e., as striped data. At step 208, the controller 110 directs all read requests to the read spare drive group 130. Hence, no read requests are directed to the write volume group 120 which frees the write volume group from performing read operations. Read operations, as indicated above, use more energy than write operations. The fact that a single drive 132 is used in the read spare drive group 130 additionally reduces the amount of energy during a read process since multiple drives are not used which would require that these multiple hard disk drives all be spinning to perform the read operation. This reduction in energy consumption together with the ability to free up the multiple disk array of the write volume group 120 to only perform write operations adds to the reduction in energy consumption of the overall system.

At step 210 of FIG. 2, pre-fetch data is stored in the solid state device group 118. The pre-fetch data is written to the solid state device group 118 from the read spare drive group 130. Data from the read spare drive group 130 contains multiple striped sets that match the format in which the data is stored in the write volume group 120. In the process of reading data from the read spare drive group 130, the controller 110 uses processes to compensate for performance limitations resulting from the use of a single drive 132. At step 212, the controller 110 monitors the frequency of the write commands received by the controller 110. At step 214, if the controller 110 determines that there are no write cycles for a predetermined period of time, the hard drives 122-128 in the write volume group 120 are spun down so that the storage array 100 consumes less power. Meanwhile, all read cycles are serviced through the read spare drive group 130. In this fashion, the write volume group 120 does not perform any read functions and can be spun down and inactive during the read cycles.

At step 216 of FIG. 2, the cooling requirements of the controller 110 are monitored by a temperature sensors 134. Temperature sensors 134 produces temperature signal that is applied to a pulse-width modulation signal generator 136. Pulse-width modulation signal generator 136 generates a pulse-width modulated signal 138 that is used to control the fans 104, 106, 108 at all times during the operation of the system based upon the cooling demand as measured by temperature sensors 134, as illustrated at step 218.

At step 220 of FIG. 2, data is written to the solid state device group when a write command is received and the write volume group 120 is spun down. When the controller 110 detects a write cycle request to the write volume group 120 and the hard drives 122-128 are spun down to their passive state, the controller 110 acknowledges the request and writes the data in the common solid state device group 118. Data is then either synchronously copied or simultaneously written to the read spare drive group 130. At step 222, the write volume group 120 is triggered to spin up each of the hard drives 122-128. Once the hard drives 122-128 are spun up in the write volume group 120, data is asynchronously written to the write volume group 120 from the solid state device group 118 at step 224. Data that is written from the solid state device group 118 is then flushed from the solid state device 118.

Hence, the disclosed embodiments provide a low power consumption storage array that separates write operations and read operations to allow a multiple disk array to spin down so that the overall system consumes less power. In addition, cooling is provided in accordance with cooling demand. Pulse-width modulation signals are used to control cooling fans are used in response to cooling demand to further reduce energy consumption. In addition to speed variations as per temperature variations 'n' number of fans out of 'x' of fans can be made to sleep mode. They can be brought to active mode again if the temperature has come to a threshold limit based on the temperature sensors. This results in less power consumption in operating "fans."

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of reducing power consumption in a storage array comprising:
- writing data to a multiple disk array in response to a write command;
- synchronously copying said data from said multiple disk array to a read spare drive;
- reading data from said read spare drive, and not from said multiple disk array;
- spinning down said multiple disk array whenever a write cycle has not been initiated for a predetermined period so that said multiple disk array enters a passive state and consumes less energy;
- writing additional data to solid state storage whenever an additional write cycle is initiated and said multiple disk array is in said passive state;
- synchronously copying said additional data written to said solid state storage to said read spare drive;
- spinning up said multiple disk array in response to initiation of said additional write cycle when said multiple disk array is in said passive state;
- writing said additional data written to said solid state storage to said multiple disk array after said multiple disk array is spun up;
- flushing said additional data written to said solid state storage after said data written to said solid state storage is written to said multiple disk array.

2. The method of claim 1 further comprising:
- writing prefetch data from said read spare drive to said solid state storage to assist in reading said data and said additional data during read operations.

3. The method of claim 2 further comprising:
- monitoring cooling demand of said storage array;
- cooling said storage array in response to said cooling demand.

4. The method of claim 3 further comprising:
- monitoring temperatures surrounding a controller of said storage array;
- generating a pulse width modulation signal in response to said temperatures;
- operating cooling fans with said pulse-width modulation signal.

5. The method of claim 3 further comprising:
- powering down a predetermined number of said cooling fans upon the occurrence of a predetermined reduction in said cooling demand.

6. A low power consumption storage array comprising:
- a read spare drive;
- a multiple disk array;
- solid state storage;
- a controller that stores a first set of data in said multiple disk array during a write cycle, copies said first set of data from said multiple disk array to said read spare drive, reads said first set of data from said read spare drive and not from said multiple disk array, spins down said multiple disk array so that said multiple disk array enters a passive state and consumes less energy whenever a write cycle has not been initiated for predetermined period, writes additional data to said solid state storage whenever an additional write cycle is initiated and said multiple disk array is in said passive state, synchronously copies said additional data written to said solid state storage to said read spare drive, spins up said multiple disk array in response to initiation of said additional write cycle when said multiple disk array is in said passive state, writes said additional data written to said solid state storage to said multiple disk array after said multiple disk array is spun up, and flushes said additional data written to said solid state storage after said additional data written to said solid state storage is written to said multiple disk array.

7. The low power consumption storage array of claim 6 further comprising:
- a temperature sensors that measures cooling demand of said low power consumption storage array and generates a temperature signal;
- a pulse-width modulation signal generator that generates a pulse-width modulation signal, in response to said temperature signal, that is applied to cooling fans to control operation of said cooling fans.

8. The low power consumption storage array of claim 7 further comprising:
- powering down a predetermined number of said cooling fans upon the occurrence of a predetermined reduction in said cooling demand.

* * * * *